(12) United States Patent
Alton, Jr. et al.

(10) Patent No.: US 7,548,032 B2
(45) Date of Patent: Jun. 16, 2009

(54) LOCOMOTIVE SPEED DETERMINATION

(75) Inventors: Robert J. Alton, Jr., Erie, PA (US);
Ajith K. Kumar, Erie, PA (US); Bret D. Worden, Union City, PA (US)

(73) Assignee: General Electric Company, Schenectady, NY (US)

( * ) Notice: Subject to any disclaimer, the term of this patent is extended or adjusted under 35 U.S.C. 154(b) by 352 days.

(21) Appl. No.: 11/209,493

(22) Filed: Aug. 23, 2005

(65) Prior Publication Data

US 2007/0046220 A1    Mar. 1, 2007

(51) Int. Cl.
*B61C 15/08* (2006.01)

(52) U.S. Cl. .................. 318/52; 318/34; 318/490; 246/167 R; 246/168.1

(58) Field of Classification Search .............. 318/52, 318/560–650, 139, 40, 43; 246/166.1; 303/146; 701/19, 20, 71; 73/488
See application file for complete search history.

(56) References Cited

U.S. PATENT DOCUMENTS

| | | | | |
|---|---|---|---|---|
| 2,735,090 A * | 2/1956 | Maenpaa | ............... | 246/168.1 |
| 4,566,067 A * | 1/1986 | Sahasrabudhe et al. | ....... | 701/20 |
| 4,578,665 A * | 3/1986 | Yang | .................. | 246/166.1 |
| 4,896,090 A | 1/1990 | Balch et al. | | |
| 5,244,171 A * | 9/1993 | Drake et al. | ............. | 246/168.1 |
| 5,346,163 A * | 9/1994 | Momma et al. | ................ | 246/5 |
| 5,654,889 A * | 8/1997 | Wood et al. | ................... | 701/71 |
| 5,661,378 A * | 8/1997 | Hapeman | .................... | 318/52 |
| 5,740,043 A * | 4/1998 | Wood et al. | ................... | 701/71 |
| 5,752,212 A * | 5/1998 | Wood et al. | ................... | 701/71 |
| 5,903,517 A * | 5/1999 | Futsuhara et al. | ............ | 367/120 |
| 5,975,656 A * | 11/1999 | Schweikert et al. | ........ | 303/132 |
| 6,012,010 A * | 1/2000 | Batistic et al. | ................ | 701/72 |
| 6,148,269 A | 11/2000 | Kuttannair et al. | | |
| 6,194,850 B1 | 2/2001 | Kumar et al. | | |
| 6,523,914 B2 * | 2/2003 | Poggenburg et al. | ........ | 303/146 |
| 6,600,979 B1 * | 7/2003 | Kumar et al. | ................. | 701/20 |
| 6,666,411 B1 * | 12/2003 | Hart et al. | ..................... | 246/62 |
| 6,728,606 B2 | 4/2004 | Kumar | | |
| 6,758,087 B2 * | 7/2004 | Balch et al. | ................. | 73/118.1 |
| 6,813,583 B2 | 11/2004 | Kumar et al. | | |
| 6,828,746 B2 * | 12/2004 | Kumar | ...................... | 318/490 |
| 7,188,341 B1 * | 3/2007 | Hawthorne et al. | ......... | 717/171 |
| 7,263,475 B2 * | 8/2007 | Hawthorne et al. | ............ | 703/8 |
| 7,302,895 B2 * | 12/2007 | Kumar et al. | ............ | 105/26.05 |
| 7,317,987 B2 * | 1/2008 | Nahla | ......................... | 701/301 |
| 2001/0035049 A1 * | 11/2001 | Balch et al. | .................. | 73/488 |
| 2002/0030406 A1 * | 3/2002 | Poggenburg et al. | ........ | 303/146 |
| 2003/0105560 A1 * | 6/2003 | Sugita et al. | .................. | 701/19 |
| 2003/0120400 A1 * | 6/2003 | Ahmed Baig et al. | ......... | 701/19 |
| 2003/0222180 A1 * | 12/2003 | Hart et al. | ............... | 246/167 R |

(Continued)

*Primary Examiner*—Paul Ip
(74) *Attorney, Agent, or Firm*—John Kramer, Esq.; Enrique J. Mora, Esq.; Beusse Wolter Sanks Mora & Maire, P.A.

(57) ABSTRACT

A method and system for determining a ground speed for locomotives (e.g., 12, 14) of a train (16) comprising at least two locomotives for use in controlling an operation of the train. The method includes selecting an axle of any one locomotive of the train for measuring a speed corresponding to the selected axle. The method also includes determining a ground speed for at least another locomotive of the train based on a measured speed corresponding to the selected axle of the one locomotive.

17 Claims, 1 Drawing Sheet

U.S. PATENT DOCUMENTS

| | | | |
|---|---|---|---|
| 2004/0093196 A1* | 5/2004 | Hawthorne et al. | 703/8 |
| 2004/0113571 A1* | 6/2004 | Kumar | 318/34 |
| 2005/0065701 A1* | 3/2005 | Kumar et al. | 701/82 |
| 2005/0120904 A1* | 6/2005 | Kumar et al. | 105/35 |
| 2006/0025903 A1* | 2/2006 | Kumar | 701/19 |
| 2006/0129289 A1* | 6/2006 | Kumar et al. | 701/29 |
| 2007/0096548 A1* | 5/2007 | Anstey et al. | 303/7 |
| 2007/0137514 A1* | 6/2007 | Kumar et al. | 105/26.05 |
| 2008/0059112 A1* | 3/2008 | Hawkins et al. | 702/148 |

* cited by examiner

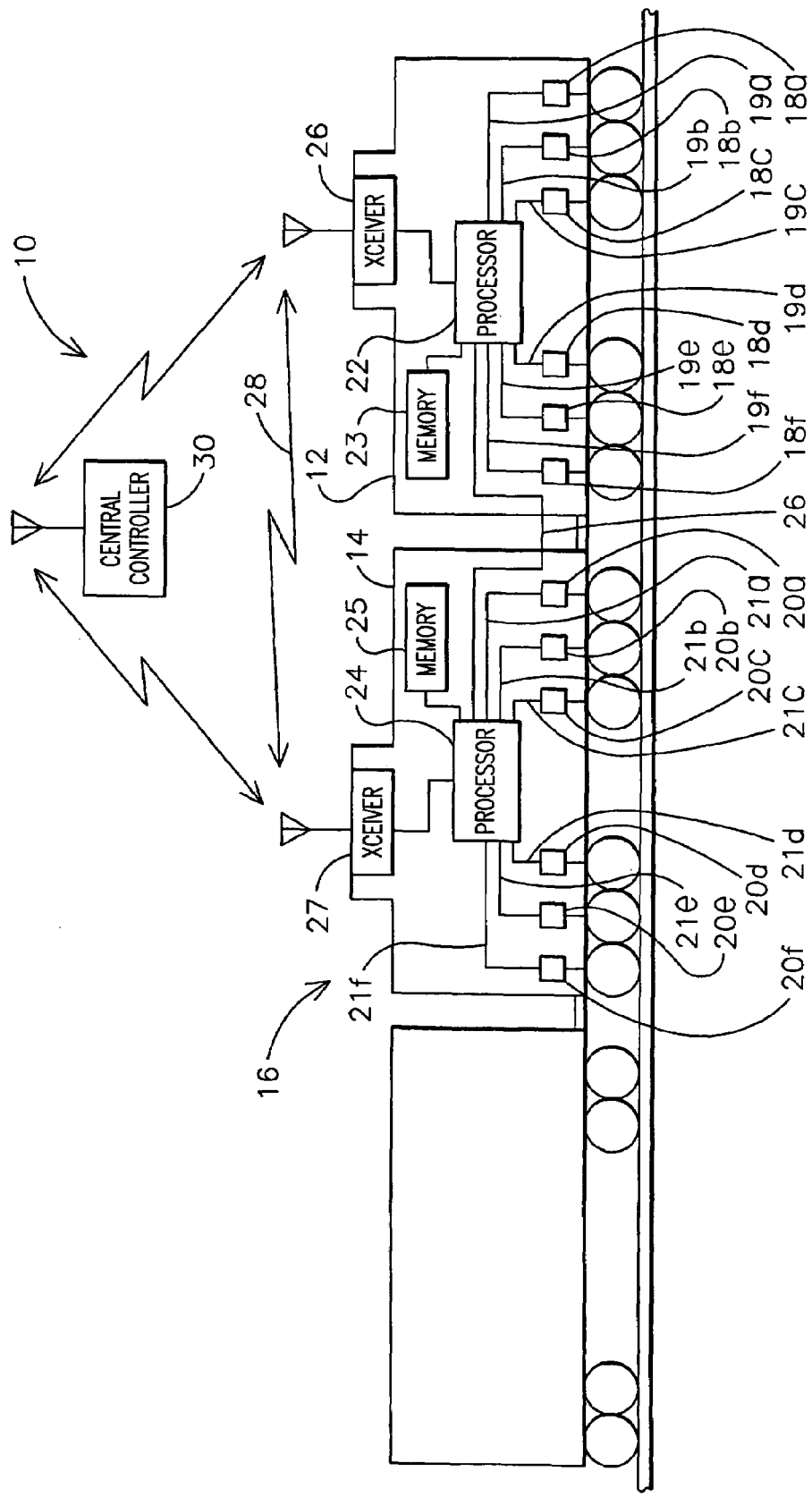

LOCOMOTIVE SPEED DETERMINATION

FIELD OF THE INVENTION

This invention relates generally to the field of rail transportation, and more particularly, to determining a ground speed of a train comprising two or more locomotives based on a wheel speed of one of the locomotives.

BACKGROUND OF THE INVENTION

In a typical rail transportation application, two or more locomotives may be used to pull a train to provide improved tractive effort and train handling capabilities. Modern locomotives commonly use sophisticated adhesion control systems, especially for relatively low speed, high tractive effort drag services. Such adhesion control systems typically require a highly accurate measurement of locomotive ground speed to control locomotive tractive efforts, such as wheel creep limit control. A ground speed of a rail locomotive is commonly derived from a wheel speed measurement measured by a speed sensor associated with a traction motor or axle on the locomotive. For example, U.S. Pat. No. 6,758,087 describes a method for measuring a locomotive speed based on a sensed axle (and corresponding wheel) speed by intermittently reducing tractive effort on one of the axles so that the creep of the axle is reduced to a nominal amount. Other speed measurement techniques may include radar sensed ground speed or GPS derived ground speed.

BRIEF DESCRIPTION OF THE DRAWINGS

FIG. 1 shows an exemplary embodiment of a system for determining a ground speed of a train for use by locomotives of the train.

DETAILED DESCRIPTION OF THE INVENTION

The present inventors have innovatively recognized certain benefits associated with using a ground speed determination of one locomotive of a train for use by other locomotives of the train. Such benefits derive primarily from the ability to reduce the number of locomotives having to make a speed determination that may include intermittently reducing the tractive effort of an axle of the locomotive. For example, instead of each locomotive of a train having to independently determine its ground speed, a single locomotive may be selected to determine a ground speed of the train. The selected locomotive's ground speed may then be used by each locomotive of the train for example to control tractive effort or for use by other locomotive systems such as an event recorder system, a cab signaling system, a flange lubrication system, or a locomotive diagnostic system.

FIG. 1 shows an exemplary embodiment of a system 10 for determining a ground speed of a train 16 comprising at least two locomotives 12, 14, for use by the locomotives 12, 14, for example, to control the respective tractive efforts of the locomotives 12, 14. The system 10 is configured for selecting an axle of a locomotive 12, 14 of the train 16 for measuring a wheel speed corresponding to the selected axle. The system 10 then determines a ground speed of each locomotive of the train 12, 14 based on the measured wheel speed corresponding to the selected axle. In the exemplary embodiment of the system 10 depicted in the Figure, each locomotive 12, 14 may include operating condition sensors 18a-18f, 20a-20f associated with respective axles of each locomotive 12, 14 to provide operating condition sensor signals 19a-19f, 21a-21f to respective locomotive processors 22, 24. One or more of the operating condition sensors 18a-18l, 20a-20f may be configured as a speed sensor for sensing an wheel speed and providing a sensor signal in the form of a sensed wheel speed to the processor 22, 24.

Each locomotive processor 22, 24 may be configured to receive the respective operating condition sensor signals 19a-19f, 21a-21f and process the signals 19a-19f, 21a-21f to generate axle condition information, such as wheel speed information, for sharing with other locomotives 12, 14 of the train 16, thereby allowing selection of at least one axle of the locomotives 22, 24 for measuring a ground speed for use by the locomotives 12, 14. Each processor 22, 24 may be in communication with a storage device, such as memory 23, 25 for storing processor instructions and information, such as operating condition sensor signal data, needed to perform processing tasks. The processor 22, 24 of each locomotive 12, 14 may be in communication with other processors 24, 22 on other locomotives 14, 12 of the train 16 to allow sharing information, such as operating condition information regarding each of the axles of the locomotives 12, 14. Information may be shared among the processors 22, 24 by using a hard-wire connection 26, such as train line or train line modem, or a wireless communication link 26, such as a radio, cellular, or satellite link.

Each processor 22, 24 may be in communication with respective transceivers 26, 27 for transmitting operating condition information to the other processors 24, 22 and receiving operating condition information, such as via wireless communication link 26. The information shared among the processors 22, 24 may be further processed to selected a single axle from among the monitored axles of each locomotive 12, 14 for performing a ground speed determination. For example, a processor 22, 24 of one of the locomotives 12, 14 of the train 16 may be designated as a master processor to receive the operating condition information from the locomotives of the train and to analyze the information to determine an axle best suited to perform a ground speed determination and generate axle selection information. For example, an axle that is experiencing a reduced tractive effort, such as an axle that has been cut out, or restricted due to a fault, an axle experiencing a reduced speed, or an axle experiencing a reduced creep may be selected as the axle to perform a ground speed determination. In another embodiment, the information from each of the locomotives 12, 14 may be transmitted off board the locomotives 12, 14 of the train 16, for example, to a central processing center 30 that determines an axle best suited to perform a ground speed determination according to the information provided by each of the locomotives 12, 14. In yet another embodiment, each processor 22, 24 may perform an initial selection of an axle of its respective locomotive 12, 14 and provide the selected axle information, for example, to the designated master processor, for choosing an axle among the initially selected axles provided by each processor to make a ground speed measurement.

After an axle is selected, the axle selection information may then be forwarded, for example, via communication link 28, or from the central controller 30, to a selected locomotive (e.g. 12) having the selected axle. The selected locomotive 22 may then perform a speed measurement on the selected axle, such as by reducing a tractive effort of the selected axle and sensing the resulting wheel speed via an operating condition sensor (e.g. 20a) configured as an wheel speed sensor. A sensed axle speed signal (e.g. 21a) may be provided to the processor 22 of the locomotive 12 for processing the sensed axle speed signal 21a to determine a ground speed for the train 16. The ground speed may then be forwarded to other locomotives 14 of the train, such as via communication link 28 or central controller 30. The ground speed may be used by each locomotive 12, 14 of the train 16, for example, to control respective tractive efforts of each of the locomotives 12, 14. In other embodiments, the ground speed may be used by other locomotive systems such as an event recorder, cab signal, flange lube, or diagnostics.

Advantageously, instead of each locomotive 12, 14 having to select one of its own axles for performing its own ground speed measurement as is typically required, a single axle speed measurement may be used as the ground speed for each of locomotives 12, 14 of the train 16. In another aspect, instead of each locomotive 12, 14 of the train 16 needing to keep a lead axle operating at a reduced threshold level as is conventionally required, by using the above described technique, only one axle of one locomotive of the train 16 needs to operated at a reduced threshold level. Other applications for the ground speed of the train 16 may include locked axle detection, wheel diameter calibration, synchronous slip detection, and adjustment of slack in the train.

The ground speed of the train 16 may need to be compensated for use by each of the locomotives 12, 14 of the train 14, for example, due to operating characteristic differences among the locomotives 12, 14. Wheel diameter differences among axles of the locomotives 12, 14 may be different, resulting in different wheel speed measurements. Such differences may need to be taken into account when using the ground speed of the train 16 for other axles of the locomotives 12, 14 of the train 16 other than the locomotive having the selected axle from which the ground speed was measured. A method of compensating the ground speed of the train 16 may include determining differences among measured wheel speeds corresponding to each of the axles of each locomotive 12, 14 of the train 16 and then generating a scaling factor to compensate for different measured respective speeds.

In an embodiment, a scaling factor may be calculated by comparing the wheel speeds of a locomotive having the axle selected for measuring the ground speed for the train (the selected locomotive) with the wheel speeds of other locomotives of the train to determine a respective scaling factor. The scaling factor may then be applied to the measured ground speed when using the ground speed for respective ones of the other locomotives, so that the ground speed is compensated for use by the other locomotive. Accordingly, each locomotive may have a different scaling factor to be applied corresponding to its different operating characteristics. In an embodiment, the scale factor may be calculated during reduced tractive effort operations, such as coasting or near-zero creep conditions. For example, a scaling factor between the selected locomotive and an other locomotive may be calculated when each of the locomotives has its respective throttle set to an idle position, and/or when a speed of the other locomotive is below a certain value, such as 5 mile per hour, and/or when relatively little or no brake is being applied.

In another aspect, the ground speed of the train may need to be compensated for transient ground speed differences of each of the locomotives, such as when coupler slack exists in the train or when coupler slack is making a transition from tension to compression, or vice-versa. A method of compensating for such transient ground speed differences among locomotives of the train may include determining that transient ground speed differences exist among the locomotives and then ignoring the operating characteristic differences of locomotives experiencing transient ground speed differences by not compensating the ground speed when a transient speed condition is occurring. For example, for a multi locomotive consist being positioned at the head end or the rear end of a train, transient coupler slack may not be present at relatively high tractive or braking effort levels because the couplers are typically in a condition of tension (motoring at head end or braking at rear end) or compression (braking at head end or motoring at rear end). Accordingly, when a condition of high tractive effort and/or high braking effort levels are present in the train, the ground speed of the train may be compensated for use by the locomotives of the train because the relatively high tractive effort or high braking effort indicates absence of coupler slack and a corresponding absence of transient speed differences among the locomotives. If a condition of relatively low tractive or braking effort levels are present, then coupler slack may be present which may result in transient speed differences among the locomotives, indicating that compensation should be not be performed at such times. Accordingly, a certain braking level effort or a certain tractive level effort, such as may be measured on each of the locomotives of the train, may be used to determine when the ground speed should or should not be compensated based presence of transient speed differences indicated by the certain braking and/or tractive effort level. For example, compensation may be ignored when a braking level effort of less than about 50,000 lbs to 20,000 pounds, and more preferably less than 30,000 pounds, or a tractive level effort of less than 50,000 lbs to 20,000 pounds, or more preferably less than 30,000 pounds, is being applied to the train.

For a multi locomotive consist being positioned in a center portion of a train remote from the head end or rear end of the train, a level of tractive effort or braking effort may not be sufficient to indicate either compression or tension at the couplers. In this case, slack may still may be present between the locomotives of the consist that may result in instantaneous speed differences among locomotives. It is desirable to detect this condition to allow disabling ground speed compensation until no slack is present in the consist, such as a time when a slack point has migrated to another position within the train remote form the consist. Detection of local slack (slack near a certain locomotive) may be accomplished be detecting an impact condition that results as a transition between tension to compression, or vice-versa. This impact may be detected by identifying discontinuities in locally sensed speeds of the respective locomotives. However, locomotive wheel speeds used in the determination of locomotive speed may include a creep error. Accordingly, impact related changes in wheel speeds need to be distinguished from creep related wheel speed changes.

The inventors have recognized that impact related wheel speed changes may be distinguished from creep related speed changes by considering common mode changes in wheel speed. An exemplary method of distinguishing impact related wheel speed changes from creep related speed changes based on sensing common changes may include determining a change in a measured wheel speed of one or more axles of a locomotive over a certain time period, such as around 10 milliseconds to 1 second, or more preferably 100 milliseconds. The method also includes determining a magnitude of the change in the wheel speed(s) over the time period. When a magnitude of a wheel speed, or respective magnitudes of a portion (such as half of the wheel speeds measured), or all of the wheel speeds measured exceeds a speed threshold, such as around 0.1 to 1 miles per hour, or more preferably 0.2 miles per hour, an impact state may be declared.

A timer may then be set for certain period of time to ignore compensating the measured ground speed for the certain period of time because an impact state may exist that may result in calculating an inaccurate scaling factor. Using the above methods, a transient wheel speed condition on any locomotives positioned anywhere within a train may be identified and compensation of the ground speed of the train may be aborted when a tractive effort is below a certain level, and/or when a braking effort is below a certain level and when an impact state exists.

Based on the foregoing specification, the methods described may be implemented using computer programming or engineering techniques including computer software, firmware, hardware or any combination or subset thereof, wherein the technical effect is to determine a ground speed of a train comprising two or more locomotives based on a wheel speed of one of the locomotives. Any such resulting program, having computer-readable code means, may be embodied or provided within one or more computer-readable media, thereby making a computer program product, i.e., an article of manufacture, according to the invention. For example, computer readable media may contain program instructions for a computer program code for processing received imaging data indicative of images acquired in a vicinity of a locomotive. The computer readable media may also include a computer program code for processing received location data indicative of a geographic location of the locomotive when the images are being acquired. In addition, the computer readable media may include a computer program code for accessing a railroad landmark database comprising a plurality of railroad landmarks associated with respective geographic locations constituting landmark tags to correlate the landmark tags with the imaging data and the location data to generate landmark correlated image data.

The computer readable media may be, for example, a fixed (hard) drive, diskette, optical disk, magnetic tape, semiconductor memory such as read-only memory (ROM), etc., or any transmitting/receiving medium such as the Internet or other communication network or link. The article of manufacture containing the computer code may be made and/or used by executing the code directly from one medium, by copying the code from one medium to another medium, or by transmitting the code over a network.

One skilled in the art of computer science will be able to combine the software created as described with appropriate general purpose or special purpose computer hardware, such as a microprocessor, to create a computer system or computer sub-system embodying the method of the invention. An apparatus for making, using or selling the invention may be one or more processing systems including, but not limited to, a central processing unit (CPU), memory, storage devices, communication links and devices, servers, I/O devices, or any sub-components of one or more processing systems, including software, firmware, hardware or any combination or subset thereof, which embody the invention.

It will be understood that a person skilled in the art may make modifications to the preferred embodiment shown herein within the scope and intent of the claims. While the present invention has been described as carried out in a specific embodiment thereof, it is not intended to be limited thereby but is intended to cover the invention broadly within the scope and spirit of the claims.

What is claimed is:

1. A method for determining a ground speed for a plurality of locomotives of a train comprising at least two locomotives for use in controlling an operation of the train, the method comprising:
    selecting an axle of any one locomotive of the train for measuring a speed corresponding to the selected axle, wherein the measuring of speed corresponding to the selected axle comprises a reductive torque coupling on the selected axle for speed determination; and
    determining a ground speed of at least another locomotive of the train based on a measured speed corresponding to the selected axle of the one locomotive, wherein every axle of said at least another locomotive of the train remains in full torque coupling regarding the ground speed determination for said at least another locomotive of the train.

2. The method of claim 1, further comprising using the determined ground speed for controlling respective tractive efforts of the locomotives.

3. The method of claim 1, further comprising using the determined ground speed for input to a locomotive event recorder.

4. The method of claim 1, further comprising using the determined ground speed for input to a locomotive cab signaling system.

5. The method of claim 1, further comprising using the determined ground speed for controlling a flange lubrication system.

6. The method of claim 1, further comprising using the determined ground speed for input to a locomotive diagnostics system.

7. The method of claim 1, wherein selecting comprises identifying an axle experiencing a reduced tractive effort among the axles of the locomotives of the train.

8. The method of claim 1, wherein selecting comprises identifying an axle experiencing a reduced speed among the axles of the locomotives of the train.

9. The method of claim 1, wherein selecting comprises identifying an axle experiencing a reduced creep among the axles of the locomotives of the train.

10. The method of claim 1, further comprising identifying a locked axle condition on a locomotive of the train based on the measured speed of the selected axle.

11. The method of claim 1, further comprising calibrating a wheel diameter of a locomotive of the train based on the measured speed of the selected axle.

12. The method of claim 1, further comprising identifying a synchronous slip condition on a locomotive of the train based on the measured speed of the selected axle.

13. A method for determining a ground speed for locomotives of a train comprising at least two locomotives for use in controlling an operation of the train, the method comprising:
    selecting an axle of any one locomotive of the train for measuring a speed corresponding to the selected axle; and
    determining a ground speed of at least another locomotive of the train based on a measured speed corresponding to the selected axle of the one locomotive;
    determining differences among measured respective speeds corresponding to respective axles of locomotives of the train; and
    compensating a determined ground speed for locomotives of the train based on operating characteristic differences among the locomotives, wherein the compensating comprises generating a scaling factor to compensate for different measured respective speeds.

14. A method for determining a ground speed for locomotives of a train comprising at least two locomotives for use in controlling an operation of the train, the method comprising:
    selecting an axle of any one locomotive of the train for measuring a speed corresponding to the selected axle; and
    determining a ground speed of at least another locomotive of the train based on a measured speed corresponding to the selected axle of the one locomotive;

determining transient ground speed differences among the locomotives; and compensating a determined ground speed for locomotives of the train based on operating characteristic differences among the locomotives, wherein the compensating comprises ignoring the operating characteristic differences of locomotives experiencing transient ground speed differences.

15. A system for determining a ground speed for a plurality of locomotives of a train comprising at least two locomotives for use in controlling an operation of the train, the system comprising:

a plurality of operating condition sensor sensors associated with respective axles of locomotives of a train providing respective operating condition sensor signals;

a processor configured to receive the respective operating condition sensor signals and to select, based on the respective operating condition signals, an axle on any one locomotive of the train to measure a speed associated with the selected axle, wherein the measuring of speed corresponding to the selected axle comprises a reductive torque coupling on the selected axle for speed determination; and a speed sensor responsive to an axle selection of the first processor to measure a speed corresponding to the selected axle and provide a measured speed signal, wherein the processor is further configured to receive the measured speed signal and to determine a ground speed for at least another locomotive of the train based on the measured speed, wherein every axle of said at least another locomotive of the train remains in full torque coupling regarding the ground speed determination for said at least another locomotive.

16. The system of claim 15, wherein the speed sensor is one of the operating condition sensors.

17. A computer-readable storage medium containing a computer-readable program code therein to program a processor for determining a ground speed for a plurality of locomotives of a train comprising at least two locomotives for use in controlling an operation of the train, the computer readable storage medium comprising:

a computer-readable code comprising instructions to select an axle of any one locomotive of the train for measuring a speed corresponding to the selected axle, wherein the measuring of speed corresponding to the selected axle comprises a reductive torque coupling on the selected axle for speed determination; and a computer-readable code comprising instructions to determine a ground speed for at least another locomotive of the train based on a measured speed corresponding to the selected axle of the one locomotive, wherein every axle of said at least another locomotive of the train remains in full torque coupling regarding the ground speed determination for said at least another locomotive.

* * * * *